(12) United States Patent
Bao et al.

(10) Patent No.: US 9,152,717 B2
(45) Date of Patent: Oct. 6, 2015

(54) SEARCH ENGINE SUGGESTION

(71) Applicant: International Business Machines Corporation, Armonk, NY (US)

(72) Inventors: Sheng Hua Bao, Beijing (CN); Jian Chen, Beijing (CN); Zhong Su, Beijing (CN); Xin Ying Yang, Beijing (CN); Xiang Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 187 days.

(21) Appl. No.: 13/905,211

(22) Filed: May 30, 2013

(65) Prior Publication Data

US 2014/0358879 A1    Dec. 4, 2014

(30) Foreign Application Priority Data

May 31, 2012  (CN) .......................... 2012 1 0177473

(51) Int. Cl.

| G06F 17/30 | (2006.01) |
|---|---|
| G06F 7/00 | (2006.01) |
| G06Q 30/02 | (2012.01) |
| G06F 9/54 | (2006.01) |

(52) U.S. Cl.
CPC .... *G06F 17/30864* (2013.01); *G06F 17/30867* (2013.01); *G06F 9/54* (2013.01); *G06F 17/30637* (2013.01); *G06Q 30/02* (2013.01); *G06Q 30/0241* (2013.01)

(58) Field of Classification Search
USPC ........................................................ 707/706
See application file for complete search history.

(56) References Cited

U.S. PATENT DOCUMENTS

| 7,849,080 | B2 * | 12/2010 | Chang et al. | .................. 707/723 |
| 8,046,351 | B2 | 10/2011 | Song et al. | |
| 8,060,513 | B2 * | 11/2011 | Basco et al. | .................. 707/739 |
| 8,364,540 | B2 * | 1/2013 | Soroca et al. | ............... 705/14.64 |
| 8,606,786 | B2 * | 12/2013 | Rounthwaite et al. | ........ 707/737 |
| 8,700,653 | B2 * | 4/2014 | Hansson et al. | ............... 707/767 |
| 8,856,096 | B2 * | 10/2014 | Marchisio et al. | ............ 707/706 |

\* cited by examiner

*Primary Examiner* — Kuen Lu
(74) *Attorney, Agent, or Firm* — Jeff Tang (57) ABSTRACT

A search engine suggestion method, apparatus, and non-transitory article of manufacture embodying computer readable instructions for data search. The method includes: obtaining a query input by a user; obtaining a query suggestion set for the query for each of a plurality of different search engines, the query suggestion set including at least one query suggestion; determining a match degree between each of the search engines and the query based on the query suggestion set and background association information of the query; and suggesting among the plurality of different search engines based on the match degrees. By use of the solutions proposed by this application, it is possible to suggest the user a more appropriate search engine(s) for data search.

20 Claims, 5 Drawing Sheets

SEARCH ENGINE SUGGESTION

CROSS-REFERENCE TO RELATED APPLICATION

This application claims priority under 35 U.S.C. §119 from Chinese Patent Application No. 201210177473.X filed May 31, 2012, the entire contents of which are incorporated herein by reference.

BACKGROUND OF THE INVENTION

1. Field of the Invention

The present invention relates to a solution of data search, and more specifically, to a method and apparatus for search engine suggestion.

2. Description of Related Art

Because users frequently search required information in massive information of the Internet, search engine has increasingly become an indispensable tool. Currently, there are a considerable amount of search engines, while different search engines have their own peculiarities; therefore, a user has to be familiar with characteristics of different search engines so as to select an appropriate search engine.

In the prior art, meta search engine are capable of integrating and ordering search results of a plurality of search engines. A general processing flow of a meta search engine includes: receiving a query input by a user; transmitting, by the meta search engine, the query to a plurality of preset search engines to perform search; integrating, by the meta search engine, search results returned from the plurality of search engines, and presenting an integrated result to the user. Although this scheme is applicable to different kinds of search engines, it cannot provide a more suitable search engine based on the characteristics of different search engines to the user for performing a search.

Therefore, the prior art still has room for improvement, and it is desirable to provide an improved method and apparatus for suggesting a more suitable search engine to a user.

SUMMARY OF THE INVENTION

According to a first aspect of the present invention, there is provided a search engine suggestion method for data search, the method including: obtaining a query input by a user; obtaining a query suggestion set for the query for each of a plurality of different search engines, the query suggestion set including at least one query suggestion having a suggestion portion; determining a match degree between each of the search engines and the query based on the query suggestion set and background association information of the query; and suggesting among the plurality of different search engines based on the match degrees.

According to a second aspect of the present invention, there is provided a search engine suggestion apparatus for data search, the apparatus including: an obtaining module configured to obtain a query input by a user; a query suggestion obtaining module configured to obtain a query suggestion set for the query for each of a plurality of different search engines, the query suggestion set includes at least one query suggestion having a suggestion portion; a matching module configured to determine a match degree between each of the search engines and the query based on the query suggestion set and background association information of the query; and a suggesting module configured to suggest among the plurality of different search engines based on the match degree.

Another aspect of the present invention provides a non-transitory article of manufacture tangibly embodying computer readable instructions, which when implemented, cause a computer to perform the steps of a search engine suggestion method for data search, said method including the steps of: obtaining a query input by a user; obtaining a query suggestion set for the query for each of a plurality of different search engines, the query suggestion set including at least one query suggestion having a suggestion portion; determining a match degree between each of the search engines and the query based on the query suggestion set and background association information of the query; and suggesting among the plurality of different search engines based on the match degrees.

With regard to a certain query, the query suggestion set thereof at a search engine reflects the search characteristics of the search engine with respect to the query. Background association information of a query is auxiliary information that reflects the true intention of a user for performing the query. Thus, by use of the solution of the present application, it is possible to measure query qualities of different search engines with respect to the query in a better way based on the match degree between the search engines and the query, so as to suggest a more suitable search engine(s).

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferable embodiments will be described in more detail with reference to the accompanying drawings, in which the preferable embodiments of the present invention have been illustrated. The present invention can be implemented in various manners, and thus should not be construed to be limited to the embodiments disclosed herein. On the contrary, those embodiments are provided for the thorough and complete understanding of the present invention and completely conveying the scope of the present invention to those skilled in the art.

Figure 1:
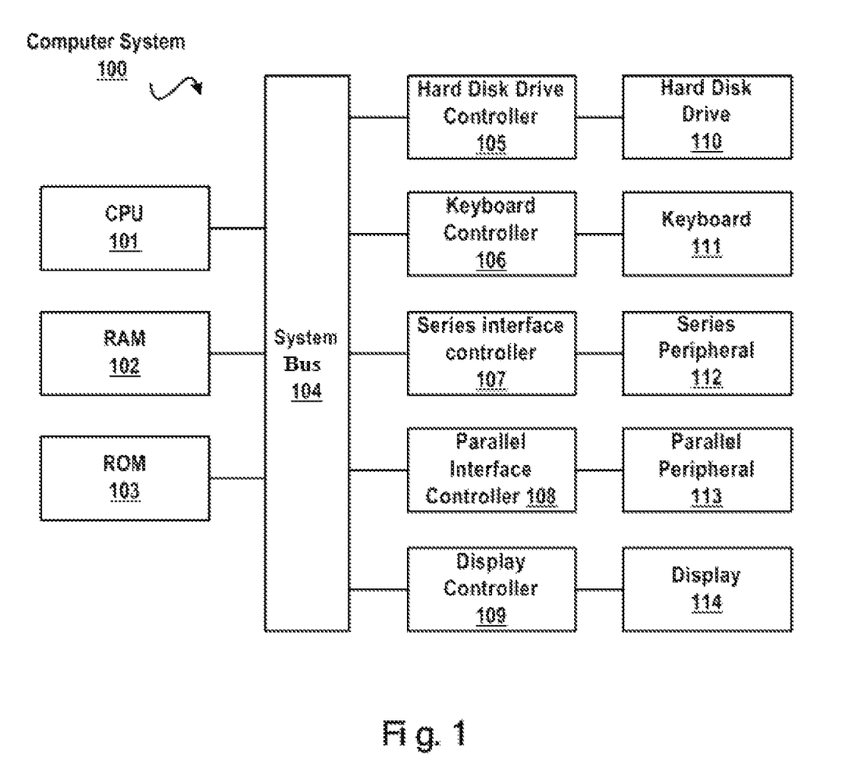
FIG. 1 shows an exemplary computer system 100 which is applicable to implement embodiments of the present invention.

FIG. 1 shows an exemplary Computer System 100 which is applicable to implement embodiments of the present invention. As shown in FIG. 1, the Computer System 100 can include: CPU (Central Process Unit) 101, RAM (Random Access Memory) 102, ROM (Read Only Memory) 103, System Bus 104, Hard Disk Drive Controller 105, Keyboard Controller 106, Series Interface Controller 107, Parallel Interface Controller 108, Display Controller 109, Hard Disk Drive 110, Keyboard 111, Series Peripheral 112 equipment, Parallel Peripheral 113 equipment, and Display 114. Among above devices, CPU 101, RAM 102, ROM 103, Hard Disk Drive Controller 105, Keyboard Controller 106, Series Interface Controller 107, Parallel Interface Controller 108, and Display Controller 109 are coupled to the System Bus 104. Hard Disk Drive 110 is coupled to Hard Disk Drive Controller 105. Keyboard 111 is coupled to Keyboard Controller 106. Series Peripheral 112 equipment is coupled to Series Interface Controller 107. Parallel Peripheral 113 equipment is coupled to Parallel Interface Controller 108. And, Display 114 is coupled to Display Controller 109. In some embodiments of the present invention, some devices can be added to or removed from the Computer System 100.

Aspects of the present invention can be embodied as a system, method, or computer program product. Accordingly, aspects of the present invention can take the form of an entirely hardware embodiment, an entirely software embodiment (including firmware, resident software, micro-code, etc.) or an embodiment combining software and hardware aspects that can generally be referred to herein as a "circuit," "module" or "system." Furthermore, aspects of the present invention can take the form of a computer program product embodied in one or more computer readable mediums having computer readable program code embodied thereon.

One or more computer readable medium(s) may be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, device, or any suitable combination of the foregoing. More specific examples, a non-exhaustive list, of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium can be any tangible medium that contains or stores a program for use by or in connection with an instruction execution system, apparatus, or device.

A computer readable signal medium can include a propagated data signal with computer readable program code embodied therein, for example, in baseband or as part of a carrier wave. A propagated signal can take any of a variety of forms, including, but not limited to, electro-magnetic, optical, and any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including, but not limited to, wireless, wireline, optical fiber cable, RF, and any suitable combination of the foregoing.

Computer program code for carrying out operations for aspects of the present invention can be written in any combination of one or more programming languages, including an object oriented programming language, such as, Java, Smalltalk, C++ or the like, and conventional procedural programming languages, such as, the "C" programming language and similar programming languages. The program code can execute entirely on the user's computer, partly on the user's computer, as a stand-alone software package, partly on the user's computer and partly on a remote computer, or entirely a remote computer or server. If executed entirely on a remote computer, the remote computer can be connected to the user's computer through any type of network, including a local area network (LAN), a wide area network (WAN), or the connection can be made to an external computer, for example, through the Internet using an Internet Service Provider.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions specified in the flowchart and/or block diagram block or blocks.

Figure 2:
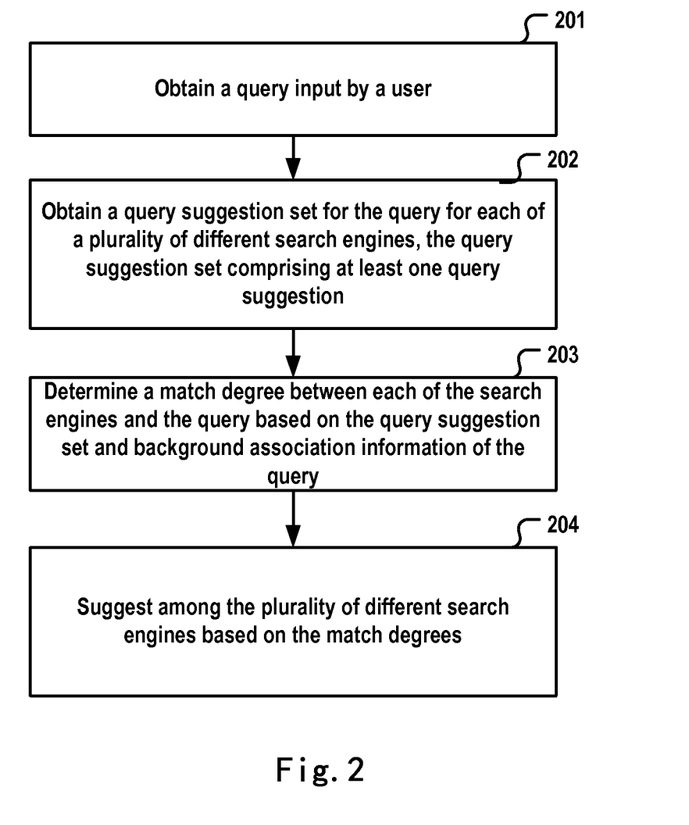
FIG. 2 shows a search engine suggestion method for data search.

In FIG. 2, a search engine suggestion method for data search is shown. At step 201, a query input by a user is obtained. A query input by a user refers to a content the subscriber intends to search, including, but not limited to, key words, sentences, and paragraphs. The manner of obtaining is also diverse, for example, keyboard input, word-crossing operation for selecting a to-be-searched content and dragging, in manners such as voice recognition, etc., and those skilled in the art would readily contemplate other alternative manners.

In a preferred embodiment, the input query can be pre-processed. For example, a plurality of sub-queries are generated after performing word segmentation to a relatively long query such as a sentence or a paragraph, and then the flow proceeds a subsequent step. Through performing conventional natural language processing to a sentence or paragraph, a plurality of individual words can be segmented as the sub-queries. The prior art has provided a plurality of methods for natural language processing and methods for semantic analysis, all of which can be applied into the steps of the embodiments of the present invention. Because the natural language processing and semantic analysis themselves are not key points of the embodiments of the present invention, they will not be detailed here.

At step 202a query suggestion set for the query for each of a plurality of different search engines is obtained. The query suggestion set includes at least one query suggestion.

Query suggestion has become an essential function for each search engine. When entry is conducted in a search form, the search form opens a drop-down prompt box to dynamically prompt some query strings associated with the input content. Generally, a query suggestion at least includes a query portion and a suggestion portion, wherein the query portion includes the input query or words substantively identical to the query, for example, after error correction, or conversion from Chinese to English, etc. The suggestion portion refers to the portion where a prompt is given by the search engine based on the input query, which is the remaining portion other than the query. For example, as far as a query suggestion "ibm careers" for a query "ibm," "ibm" is the query portion and "careers" is the suggestion portion.

It should be noted that embodiments of the present application focus on how to use a result of query suggestion, not on how to realize a query suggestion. Further, implementation manners of query suggestion also have a plurality of known manners, and the mechanisms for different search engines to implement query suggestion are also different from one another, which will not be detailed here.

For different kinds of search engines, a query suggestion set for a particular query in the search engine can be obtained through APIs. While the present invention is not limited to the following examples, hereinafter, only query suggestion APIs of Google, Baidu, and Bing are illustrated. Those skilled in the art would appreciate and can use the query suggestion APIs of other search engine.

For example, a query suggestion set in XML format for a query keyword "ibm" in Google can be obtained via "http://google.com/complete/search?output=toolbar&q=ibm". If "ibm" is replaced by other query keyword, a corresponding query suggestion set can be returned. In this manner, the query suggestion set for querying "ibm" is illustrated below:

```
<CompleteSuggestion>
<suggestion data="ibm"/>
<num_queries int="446000000"/>
</CompleteSuggestion>
<CompleteSuggestion>
<suggestion data="ibm careers"/>
<num_queries int="38800000"/>
</CompleteSuggestion>
<CompleteSuggestion>
<suggestion data="ibm jobs"/>
<num_queries int="152000000"/>
</CompleteSuggestion>
<CompleteSuggestion>
<suggestion data="ibm credit union"/>
<num_queries int="2430000"/>
</CompleteSuggestion>
...  ...  ...  ...
<CompleteSuggestion>
<suggestion data="ibm spss"/>
<num_queries int="4280000"/>
</CompleteSuggestion>
```

In an embodiment, a plurality of prior art methods for performing data reading to XML files can be adopted for the query suggestion in the format of XML. For example, XmlReader class in .NET can be used to read a query suggestion from the above XML format file: XmlReader.Create("http://google.com/complete/search?output=toolbar&q="+Keyword).

Further, a query suggestion set for a query keyword can be obtained in Baidu via "http://suggestion.baidu.com/su?wd=Keyword". For example, when the key word is ibm, the returned query suggestion set is window.baidu.sug({q: "ibm",p:true,s:["ibm laptop","ibm official website", "ibm server","ibm t60","ibm t61","ibm thinkpad","ibm t43","ibm t42","ibm recruitment","ibm t400"]}).

Further, a query suggestion set for a query keyword can be obtained in Bing via "http://api.search.live.net/qson.aspx?query=Keyword". For example, when the keyword is ibm, the returned query suggestion set is: {"SearchSuggestion":{"Query": "ibm", "Section":[{"Text": "ibm laptop"},{"Text": "ibmofficial website"},{"Text": "ibm server"},{"Text": "ibm t60"},{"Text": "ibm t61"},{"Text": "ibm t43"},{"Text": "ibm laptop official website"},{"Text": "ibm laptop"},{"Text": "ibm x61"},{"Text": "ibm laptop price"},{"Text": "ibm recruitment"}]}}.

The present application does not focus on how to invoke these APIs. Those skilled in the art would appreciate how to invoke these APIs in an application, which will not be detailed here. For example, it can refer to following manner provided by the following webpage link: http://answers.oreilly.com/topic/1526-how-to-use-the-google-suggest-api-to-come-up-with-topics-for-answers In a preferred embodiment, if a query input by a user is segmented into a plurality of sub-queries, then a query suggest set of each sub-query is obtained for each of a plurality of different search engines.

At step 203, a match degree between each of the search engines and the query is determined based on the query suggestion set and background association information of the query.

Background association information of a query is information that reflects the true intention of a user for performing the query, which can include a plurality of types: context information of the query, including, but not limited to, the sentence, paragraph, page (any document page such as webpage) where the query is located, or an adjacent page; historical information of the query user, including, but not limited to, historical browse information, and historical query information; of course, it can also define a time whose historical information time is much closer to the user query, such that the historical information better reflects the true intention of the user for performing the query. Any auxiliary information, as long as it helps to determine the true intention of the user for performing the query, can act as background association information. Other alternative embodiments can be contemplated, which need not to be enumerated; moreover, different types of background association information can be used individually or jointly; when they are used jointly, different weights can be granted.

For a certain query, its query suggestion set in a search engine reflects the search characteristics of the search engine with respect to the query. Because background association information of a query is the background information reflecting the true intention of the user for performing the query, the query quality of the search engine with respect to the query can be better measured based on the corresponding match degree. There are multiple manners capable of determining a match degree. For each of the search engines, in one embodiment, the match degree can be determined based on the times of occurrence of the suggestion portion of all query suggestions in the query suggestion set in the background association information. In another embodiment, the step of determining a match degree between each of the search engines and the query based on the query suggestion set and the background association information of the query includes: determining a feature vector for the background association information; determining a feature vector for each search engine based on a suggestion portion of the query suggestion in the query suggestion set; and determining the match degree based on the feature vector for the background association information and the feature vector for the search engine. These steps are illustrated through three embodiments in FIGS. 3-5.

In a preferred embodiment, a sub-match degree between each sub-query and a search engine is calculated based on step 203, and then the match degree between the query and the search engine is determined by integrating all sub-match degrees. As an improvement, statistics can be taken from the part of speech of each sub-query, and then the sum is determined according to a weight of the part of speech. The weight of the part of speech reflects the significance degree for different parts of speech, which can be determined empirically; or, an existing machine learning method can be adopted to learn a weight for each segmented sub-query.

At step 204, suggestion is performed among the plurality of search engines based on the match degree. In one embodiment, a suggestion list of search engines, which are ranked according to the match degrees, can be provided. Responsive to a selection of the user, the query is sent to a search engine selected by the user. In another embodiment, the query can be directly sent to at least one search engine whose match degree ranks top.

Figure 3:
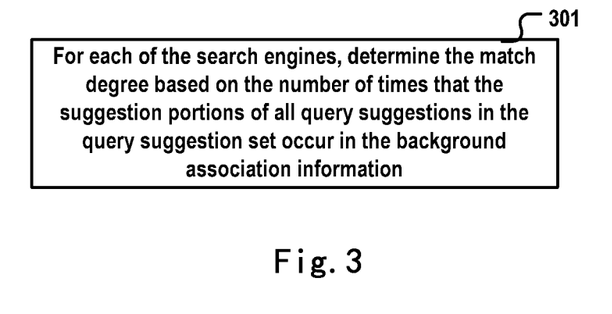
FIG. 3 shows a first embodiment of step 203 in FIG. 2.

FIG. 3 illustrates a first embodiment of step 203 in FIG. 2, primarily including the following steps: at step 301, the match degree for each search engine is determined based on the number of times that the suggestion portions of all query suggestions in the query suggestion set occur in the background association information. For an individual query suggestion, a match degree between the individual query suggestion and the query can be determined through making statistics on the number of times that the suggestion portion of the individual query suggestion occur in the background association information, for example, in the context, of the query. In one embodiment, a sum of match degrees between all individual query suggestions in the query suggestion set of a search engine and the query can act as the match degree between the search engine and the query. In a preferred embodiment, the match degree can be adjusted by taking into consideration the order of a single query suggestion in the query suggestion set. In other words, adjustment of weight can be performed by making reference to the order of a query suggestion, such that for an individual query suggestion that ranks top, a higher weight is assigned when calculating the match degree of the individual query suggestion.

In a preferred embodiment, for some or all query suggestions, the number of times or frequency of occurrence in the background association information can be directly summed, and the match degree of a single query suggestion can be determined based on the number of times or frequency. This scheme is more applicable in an embodiment where the suggestion portion of a query suggestion is very short, or the suggestion portion cannot reflect the characteristic of the query suggestion.

Figure 4:
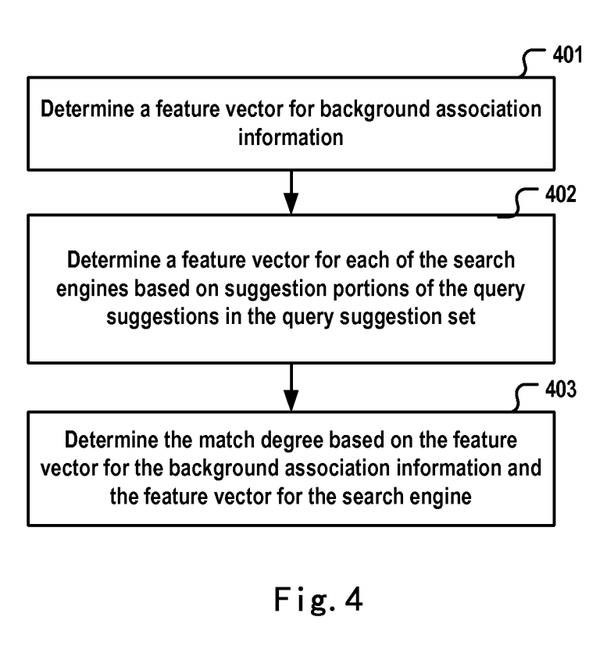
FIG. 4 shows a second embodiment of step 203 in FIG. 2.

FIG. 4 shows a second embodiment of step 203 in FIG. 2, wherein the match degree can be determined based on a feature vector for the background association or a feature vector for the search engine.

At step 401, a feature vector for background association information is determined. Background association information can be regarded as a document. Currently, there are many expression modules for documents, wherein the most typically used one is a vector space model (VSM). In a VSM model, each document is expressed as a feature vector, and each component in the feature vector indicates a weight of a feature word in the document. The prior art has provided methods of forming a feature vector by performing natural language processing and semantic analysis on a document. These methods can be applied to the steps in the embodiments of the present invention. Because the natural language processing and semantic analysis themselves are not the focus of the embodiments of the present invention, they will not be detailed here. For the convenience of depiction, in the embodiments of the present application, a feature vector for background association information can be determined based on a basic language unit (word or phrase) appearing in a document and capable of representing the document content, which is expressed as $s(s1, s2, s3, s4 \ldots sn)$.

At step 402, a feature vector for each search engine is determined based on suggestion portions of the query suggestions in the query suggestion set, wherein a feature vector for an individual search engine can also be determined using a vector space model based on the suggestion portion of the query suggestion of the search engine. For the convenience of subsequent example, suppose that a feature vector a for a first search engine has been determined as $(a1, a2, a3, a4 \ldots an)$, a feature vector b for a second search engine is $(b1, b2, b3, b4 \ldots bn)$, and a feature vector c for a third search engine is $(c1, c2, c3, c4 \ldots cn)$.

Step 401 and step 402 have no essential association. As a result, their sequences can be changed or in parallel.

At step 403, the match degree is determined based on a similarity between the feature vector for the background association information and the feature vector for the search engine.

In the VSM, a cosine similarity is generally calculated using a cosine value of an included angle between vectors. The calculation equation for the cosine similarity is $(A \cdot B)/|A| \times |B|$, wherein $(A \cdot B)$ denotes dot product of vector A and vector B, $|A|$ and $|B|$ are modules of vector A and vector B, respectively, $|A|=(a1^2+a2^2+\ldots+an^2)^{(1/2)}$; $|B|=(b1^2+b2^2+\ldots+bn^2)^{(1/2)}$. Those skilled in the art may also adopt other manners, for example Euclidean Distance. Comparatively speaking, the cosine similarity focuses more on the directional difference between two vectors, but is insensitive to an absolute value. Besides, the dot product of vector A and vector B can be directly used to indicate their similarity. This approach has a low computational complexity but a greater error than the cosine similarity.

Specifically for the embodiment of FIG. 4, inner product similarities $s \cdot a$, $s \cdot b$, $s \cdot c$ can act as the match degrees between respective search engines and the query. Cosine similarities $s \cdot a$ usual, $s \cdot a/|s||a|$, $s \cdot b/|s||b|$, $s \cdot c/|s||b|$ can also act as the match degrees between respective search engines and the query.

Figure 5:
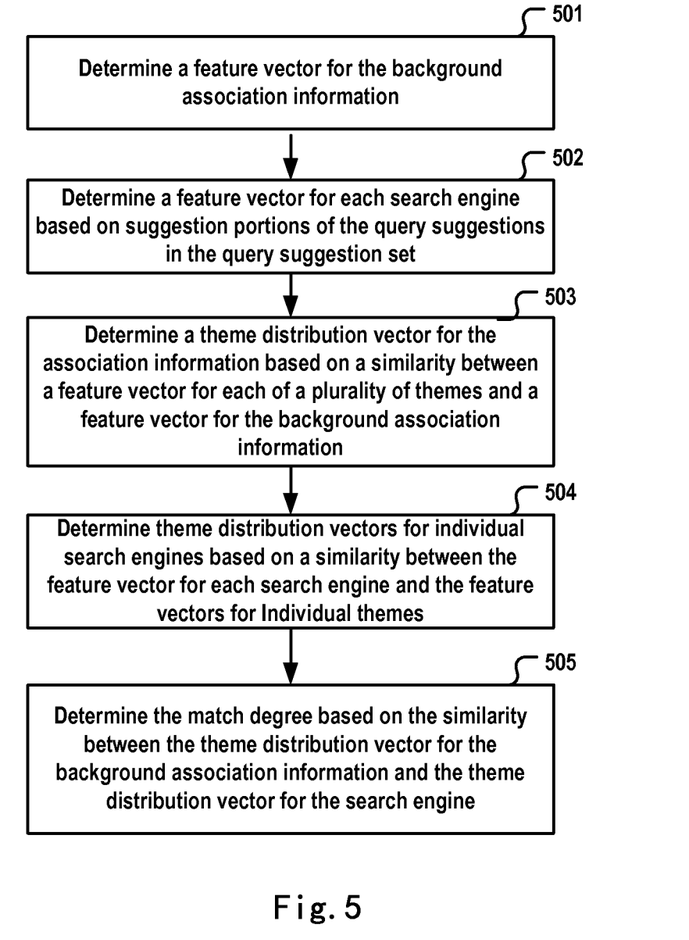
FIG. 5 shows a third embodiment of step 203 in FIG. 2.

FIG. 5 shows a third embodiment of step 203 in FIG. 2, wherein determining a match degree is based on a similarity between a theme distribution vector for background association information and a theme distribution vector for each search engine.

At step 501, a feature vector for the background association information is determined. For details, refer to the descriptions in connection with step 401 in FIG. 4. In one example, feature vector $(s1, s2, s3, s4 \ldots sn)$ for the background association information s is determined.

At step 502, a feature vector for each search engine is determined based on suggestion portions of the query suggestions in the query suggestion set. For details, refer to the descriptions in connection with step 402 in FIG. 4. In this embodiment, a feature vector a for a first search engine is $(a1, a2, a3, a4 \ldots an)$, a feature vector b for a second search engine is $(b1, b2, b3, b4 \ldots bn)$, and a feature vector c for a third search engine is $(c1, c2, c3, c4 \ldots cn)$.

At step 503, a theme distribution vector for the background association information is determined based on a similarity between a feature vector for each of a plurality of themes and a feature vector for the background association information.

Step 503 primarily addresses use of a plurality of existing themes, instead of how to determine a plurality of themes. Those skilled in the art would appreciate that a plurality of themes can be determined in a plurality of manners, for example, but not limited to, clustering analysis method, machine learning, expert system, and relevant known methods in the prior art. The feature vector for each theme reflects the main characteristics of the theme, for example, a feature vector tx: $(tx1, tx2, tx3, \ldots, txn)$ for a news theme x; a vector feature ty: $(ty1, ty2, ty3, \ldots tyn)$ for a military theme y; a feature vector tz: $(tz1, tz2, tz3 \ldots tzn)$ for a sports theme z.

The theme distribution vector for the background association information can be determined as $<s \cdot tx, s \cdot ty, \ldots, s \cdot tz>$, where the similarity between the feature vector s for the background association information and a feature vector for each theme function as components, for example, by use of an inner product similarity.

At step 504, a theme distribution vector for each search engine is determined based on a similarity between a feature vector for each search engine and a feature vector for each theme. For example, the theme distribution vector for a first search engine: $<a1 \cdot tx, a2 \cdot ty, \ldots, an \cdot tz>$, a theme distribution vector for a second search engine: $<b1 \cdot tx, b2 \cdot ty, \ldots, bn \cdot tz>$, and a theme distribution vector for a third search engine: $<c1 \cdot tx, c2 \cdot ty, \ldots, cn \cdot tz>$.

At step 505, the match degree is determined based on the similarity between the theme distribution vector for the background association information and the theme distribution vector for the search engine.

FIG. 5 is an embodiment, it should be noted that step 501 and step 502 have no essential association. As a result, their sequences can be changed or in parallel, as long as step 501 is performed before step 503 and step 502 is performed before step 504. Likewise, the sequences of step 503 and step 504 can be changed or processed in parallel.

Figure 6:
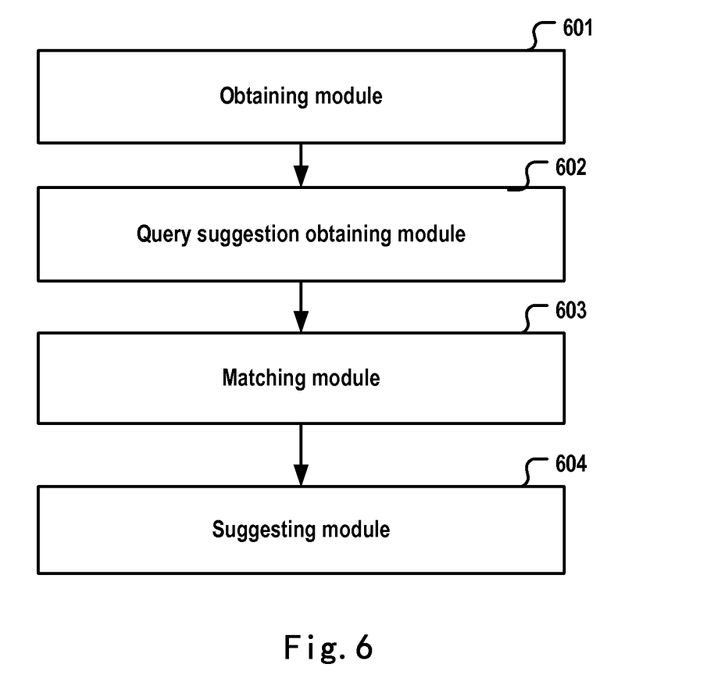
FIG. 6 shows a search engine suggestion apparatus for data search.

FIG. 6 shows a search engine suggestion apparatus for data search, the apparatus including: an obtaining module 601 configured to obtain a query input by a user; a query suggestion obtaining module 602 configured to obtain a query suggestion set for the query for each of a plurality of different search engines, the query suggestion set including at least one query suggestion; a matching module 603 configured to determine a match degree between each of the search engines and the query based on the query suggestion set and background association information of the query; and a suggesting module 604 configured to suggesting among the plurality of different search engines based on the match degrees.

In a specific embodiment, the background association information includes one or more of context information of the query and historical browse information of the user.

In a specific embodiment, the matching module 603 includes a module configured to determine the match degree between each of the search engines and the query for each of the search engines based on a number of times that suggestion portions of all query suggestions in the query suggestion set occur in the background association information.

In another specific embodiment, the matching module 603 includes a module configured to determine a feature vector for the background association information, a module configured to determine a feature vector for each search engine based on suggestion portions of the query suggestions in the query suggestion set, and a module configured to determine the match degree based on the feature vector for the background association information and the feature vector for the search engine.

In a preferred embodiment, the module configured to determine the match degree based on the feature vector for the background association information and the feature vector for the search engine include a module configured to determine the match degree based on a similarity between the feature vector for the background association information and the feature vector for the search engine.

In a preferred embodiment, the module configured to determine the match degree based on the feature vector for the background association information and the feature vector for the search engine includes a module configured to determine a theme distribution vector for the background association information based on a similarity between a feature vector for each of a plurality of themes and the feature vector for the background association information, a module configured to determine a theme distribution vector for each of the search engines based on a similarity between the feature vector for each of the plurality of themes and the feature vector for each of the search engines, and a module configured to determine the match degree based on similarity between the theme distribution vector for the background association information and the theme distribution vector for each of the search engines.

As an improvement for the apparatus of FIG. 6, the apparatus further includes a module configured to perform word segmentation processing to the query to generate a plurality of sub-query words, wherein the query suggestion obtaining module 602 includes a module configured to obtain a query suggestion set for each of the sub-query words, wherein the matching module 603 includes a module configured to determine the match degree of the query based on the match degrees of the sub-queries.

In a specific embodiment, the suggesting module 604 includes a module configured to provide a list of search engines ranked according to the match degrees and a module configured to send the query to a search engine selected by the user responsive to user selection. In another embodiment, the suggesting module 604 includes a module configured to directly send the query to at least one search engine whose match degree ranks top.

It can be appreciated that the flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology provided herein was chosen to best explain the principles of the embodiments, the practical application or technical improvement over technologies found in the marketplace, or to enable others of ordinary skill in the art to understand the embodiments disclosed herein.

What is claimed is:

1. A search engine suggestion method for data search, comprising:
  obtaining a query input by a user;
  obtaining a query suggestion set for the query for each of a plurality of different search engines, the query suggestion set including at least one query suggestion;
  determining a match degree, based on the query suggestion set and background association information of the query, between each of the search engines and the query, wherein the step of determining a match degree comprises:
  determining a feature vector for the background association information;
  determining a feature vector for each of the search engines based on suggestion portions of the query suggestions in the query suggestion set; and
  determining the match degree between each of the search engines and the query based on the feature vector for the background association information and the feature vector for the search engine; and
  suggesting among the plurality of different search engines based on the match degrees.

2. The method according to claim 1, wherein the background association information comprises one or more of the following:
  context information of the query; and
  historical information of the user.

3. The method according to claim 1, wherein determining a match degree between each of the search engines and the query based on the query suggestion set and background association information of the query includes determining the match degree for each of the search engines based on a number of times that suggestion portions of all query suggestions in the query suggestion set occur in the background association information.

4. The method according to claim 1, wherein determining the match degree between each of the search engines and the query based on the feature vector for the background association information and the feature vector for the search engine includes determining the match degree based on a similarity between the feature vector for the background association information and the feature vector for the search engine.

5. The method according to claim 1, wherein determining the match degree between each of the search engines and the query based on the feature vector for the background association information and the feature vector for the search engine comprises:
  determining a theme distribution vector for the background association information based on a similarity between a feature vector for each of a plurality of themes and a feature vector for the background association information;
  determining a theme distribution vector for each of the search engines based on a similarity between the feature vector for each of the plurality of themes and the feature vector for each of the search engines; and
  determining the match degree based on a similarity between the theme distribution vector for the background association information and the theme distribution vector for each of the search engines.

6. The method according to claim 1, comprising:
  performing, after the step of obtaining a query input by a user, word segmentation processing to the query to generate a plurality of sub-query words;
  obtaining a query suggestion set, in the step of obtaining a query suggestion set for the query in each of the search engines, for each of the sub-query words; and
  determining the match degree of the query, in the step of determining a match degree between each of the search engines and the query based on the query suggestion set and background association information of the query, based on match degrees of the sub-queries.

7. The method according to claim 1, wherein suggesting among the plurality of different search engines based on the match degrees comprises:
  providing a list of search engine suggestions ranked according to the match degree; and
  sending, responsive to a selection of the user, the query to a search engine selected by the user.

8. The method according to claim 1, wherein suggesting among the plurality of different search engines based on the match degrees includes directly sending the query to at least one search engine whose match degree ranks top.

9. A search engine suggestion apparatus for data search, the search engine apparatus comprising:
  a memory;
  a processor communicatively coupled to the memory: and
  a search engine module communicatively coupled to the memory and the processor, wherein the search engine module is configured to perform the steps of a method comprising:
  obtaining a query input by a user;
  obtaining a query suggestion set for the query for each of a plurality of different search engines, the query suggestion set including at least one query suggestion;
  determining a match degree, based on the query suggestion set and background association information of the query, between each of the search engines and the query, wherein the step of determining a match degree comprises:
  determining a feature vector for the background association information;
  determining a feature vector for each of the search engines based on suggestion portions of the query suggestions in the query suggestion set; and
  determining the match degree between each of the search engines and the query based on the feature vector for the background association information and the feature vector for the search engine; and
  suggesting among the plurality of different search engines based on the match degrees.

10. The apparatus according to claim 9, wherein the background association information comprises one or more of the following:
  context information of the query; and
  historical information of the user.

11. The apparatus according to claim 9, wherein determining a match degree between each of the search engines and the query based on the query suggestion set and background association information of the query includes determining the match degree for each of the search engines based on a number of times that suggestion portions of all query suggestions in the query suggestion set occur in the background association information.

12. The apparatus according to claim 9, wherein determining the match degree between each of the search engines and the query based on the feature vector for the background association information and the feature vector for the search engine includes determining the match degree based on a similarity between the feature vector for the background association information and the feature vector for the search engine.

13. The apparatus according to claim 9, wherein determining the match degree between each of the search engines and the query based on the feature vector for the background association information and the feature vector for the search engine comprises:
   determining a theme distribution vector for the background association information based on a similarity between a feature vector for each of a plurality of themes and a feature vector for the background association information;
   determining a theme distribution vector for each of the search engines based on a similarity between the feature vector for each of the plurality of themes and the feature vector for each of the search engines; and
   determining the match degree based on a similarity between the theme distribution vector for the background association information and the theme distribution vector for each of the search engines.

14. The apparatus according to claim 9, the steps of the method comprising:
   performing, after the step of obtaining a query input by a user, word segmentation processing to the query to generate a plurality of sub-query words;
   obtaining a query suggestion set, in the step of obtaining a query suggestion set for the query in each of the search engines, for each of the sub-query words; and
   determining the match degree of the query, in the step of determining a match degree between each of the search engines and the query based on the query suggestion set and background association information of the query, based on match degrees of the sub-queries.

15. The apparatus according to claim 9, wherein suggesting among the plurality of different search engines based on the match degrees comprises:
   providing a list of search engine suggestions ranked according to the match degree; and
   sending responsive to a selection of the user, the query to a search engine selected by the user.

16. The apparatus according to claim 9, wherein suggesting among the plurality of different search engines based on the match degrees includes directly sending the query to at least one search engine whose match degree ranks top.

17. A non-transitory article of manufacture tangibly embodying computer readable instructions, which when implemented, cause a computer to perform the steps of a search engine suggestion method for data search, said method comprising the steps of:
   obtaining a query input by a user;
   obtaining a query suggestion set for the query for each of a plurality of different search engines, the query suggestion set including at least one query suggestion;
   determining a match degree, based on the query suggestion set and background association information of the query, between each of the search engines and the query, wherein the step of determining a match degree comprises:
      determining a feature vector for the background association information;
      determining a feature vector for each of the search engines based on suggestion portions of the query suggestions in the query suggestion set; and
      determining the match degree between each of the search engines and the query based on the feature vector for the background association information and the feature vector for the search engine; and
   suggesting among the plurality of different search engines based on the match degrees.

18. A non-transitory article of manufacture according to claim 17, wherein the background association information comprises one or more of the following:
   context information of the query; and
   historical information of the user.

19. A non-transitory article of manufacture according to claim 17, wherein determining a match degree between each of the search engines and the query based on the query suggestion set and background association information of the query includes determining the match degree for each of the search engines based on a number of times that suggestion portions of all query suggestions in the query suggestion set occur in the background association information.

20. A non-transitory article of manufacture according to claim 17, wherein determining the match degree between each of the search engines and the query based on the feature vector for the background association information and the feature vector for the search engine includes determining the match degree based on a similarity between the feature vector for the background association information and the feature vector for the search engine.

* * * * *